(12) United States Patent
Kuzmin et al.

(10) Patent No.: US 9,457,294 B2
(45) Date of Patent: Oct. 4, 2016

(54) APPARATUS AND PROCESS FOR CONTACTING AND SEPARATING LIQUIDS

(71) Applicants: UOP LLC, Des Plaines, IL (US); Boreskov Institute of Catalysis, Siberian Branch of Russian Academy of Sciences, Novosibirsk (RU)

(72) Inventors: Andrey Kuzmin, Novosibirsk (RU); Aziz Sattar, West Chicago, IL (US); Lev Davydov, Northbrook, IL (US)

(73) Assignees: UOP LLC, Des Plaines, IL (US); BORESKOV INSTITUTE OF CATALYSIS, Novosibirsk (RU)

( * ) Notice: Subject to any disclaimer, the term of this patent is extended or adjusted under 35 U.S.C. 154(b) by 786 days.

(21) Appl. No.: 13/709,329

(22) Filed: Dec. 10, 2012

(65) Prior Publication Data

US 2014/0160879 A1 Jun. 12, 2014

(51) Int. Cl.
  *B01D 11/04* (2006.01)
  *B01D 17/038* (2006.01)
  *B01D 17/04* (2006.01)
  *B01F 5/00* (2006.01)
  *B01D 17/02* (2006.01)

(52) U.S. Cl.
  CPC ....... *B01D 11/0476* (2013.01); *B01D 17/0217* (2013.01); *B01D 17/045* (2013.01); *B01F 5/0057* (2013.01)

(58) Field of Classification Search
  CPC .......... B01D 11/0476; B01D 17/0217; B01D 17/045; B01F 5/0057
  See application file for complete search history.

(56) References Cited

U.S. PATENT DOCUMENTS

| | | |
|---|---|---|
| 2,659,664 A | 11/1953 | Works et al. |
| 3,784,009 A | 1/1974 | Maciula |
| 3,867,103 A | 2/1975 | Boney et al. |
| 4,604,988 A | 8/1986 | Rao |
| 5,098,668 A | 3/1992 | Callen et al. |
| 5,405,497 A | 4/1995 | Torregrossa |
| 5,462,639 A | 10/1995 | Matthews et al. |
| 6,241,809 B1 | 6/2001 | Hopkins |
| 6,303,843 B1 | 10/2001 | Anderson et al. |
| 6,322,763 B1 | 11/2001 | McDaniel |
| 6,430,937 B2 | 8/2002 | Cho et al. |
| 6,464,210 B1 | 10/2002 | Teran et al. |
| 6,576,029 B2 | 6/2003 | West |
| 6,709,500 B1 | 3/2004 | West |

(Continued)

FOREIGN PATENT DOCUMENTS

| | | |
|---|---|---|
| CN | 2628149 Y | 7/2004 |
| EP | 1406731 | 5/2005 |

(Continued)

OTHER PUBLICATIONS

Am Ende et al., "Interfacial Area of Dispersions of Sulfuric Acid and Hydrocarbons", Industrial & Engineering Chemistry Research, Dec. 1995, vol. 34, No. 12, pp. 4343-4350.

(Continued)

*Primary Examiner* — David A Reifsnyder

(57) ABSTRACT

One exemplary embodiment can be an apparatus for contacting a first liquid and a second liquid. The apparatus can include a vessel. The vessel can include a wall and a funnical frustum. The wall may form a perimeter about an interior space and include a first side and a second side forming a passageway communicating at least one of the first and second liquids to the interior space. The funnical frustum may be positioned proximate to the passageway and abut the wall for facilitating contacting of the first and second liquids.

18 Claims, 7 Drawing Sheets

(56) References Cited

U.S. PATENT DOCUMENTS

| | | | |
|---|---|---|---|
| 6,811,713 B2* | 11/2004 | Arnaud | B01D 21/2433 209/715 |
| 6,852,902 B2 | 2/2005 | Smith, Jr. | |
| 7,126,038 B2 | 10/2006 | Smith, Jr. | |
| 7,326,333 B2 | 2/2008 | Laricchia et al. | |
| 8,028,975 B2 | 10/2011 | Tertel et al. | |
| 2009/0115076 A1 | 5/2009 | Makhotkin et al. | |
| 2009/0221863 A1 | 9/2009 | Strauss et al. | |
| 2009/0283474 A1 | 11/2009 | Achard et al. | |
| 2010/0258427 A1 | 10/2010 | Towler | |
| 2011/0239862 A1 | 10/2011 | Davydov | |
| 2012/0000827 A1 | 1/2012 | Krupa et al. | |
| 2012/0118818 A1* | 5/2012 | Moraes | B01D 17/0217 210/512.1 |
| 2014/0158644 A1* | 6/2014 | Kuzmin | B01D 17/045 210/799 |

FOREIGN PATENT DOCUMENTS

| | | |
|---|---|---|
| GB | 2430637 A | 4/2007 |
| KR | 972921 | 7/2010 |
| RU | 2071839 C1 | 1/1997 |

OTHER PUBLICATIONS

Baird et al., "Liquid-Liquid Extraction Using Vortex Rings in a Batch Cell", Trans IChemE, Jul. 1992, vol. 70, No. A4, pp. 323-332.
Abstract of CN 1490070 Publication Date Apr. 21, 2004 by Zhang Wenfei.
Abstract of CN 201258914 Publication Date Jun. 17, 2009 by Luoyang Siyite Bearing Co. Ltd.
Abstract of CN 2573055 Publication Date Sep. 17, 2003 by Zhang Wenfei.
Martin et al., "Tangential Flow Development for Laminar Axial Flow in an Annulus With a Rotating Inner Cylinder", Proc. R. Soc. Lond. A., May 2, 1972, vol. 328, No. 1572, pp. 123-141.
"Vortex De-Pollution System—The Leading Solution That Meets UK Legislation Requirements", at www.vortexdepollution.com/lpg.html, 2008, pp. 6 screen pages.
"LPG Recovery from End of Life Vehicles", at www.atfprofessional.co.uk/lpgrecovery.aspx, p. 1 screen page, Dec. 19, 2011.
Weinstein et al., "Liquid-Liquid Contacting in Unbaffled, Agitated Vessels", AIChE Seventy-Fourth National Meeting New Orleans, LA, Mar. 11, 1973, Volume Paper, No. 91A, pp. 40 Pages.

* cited by examiner

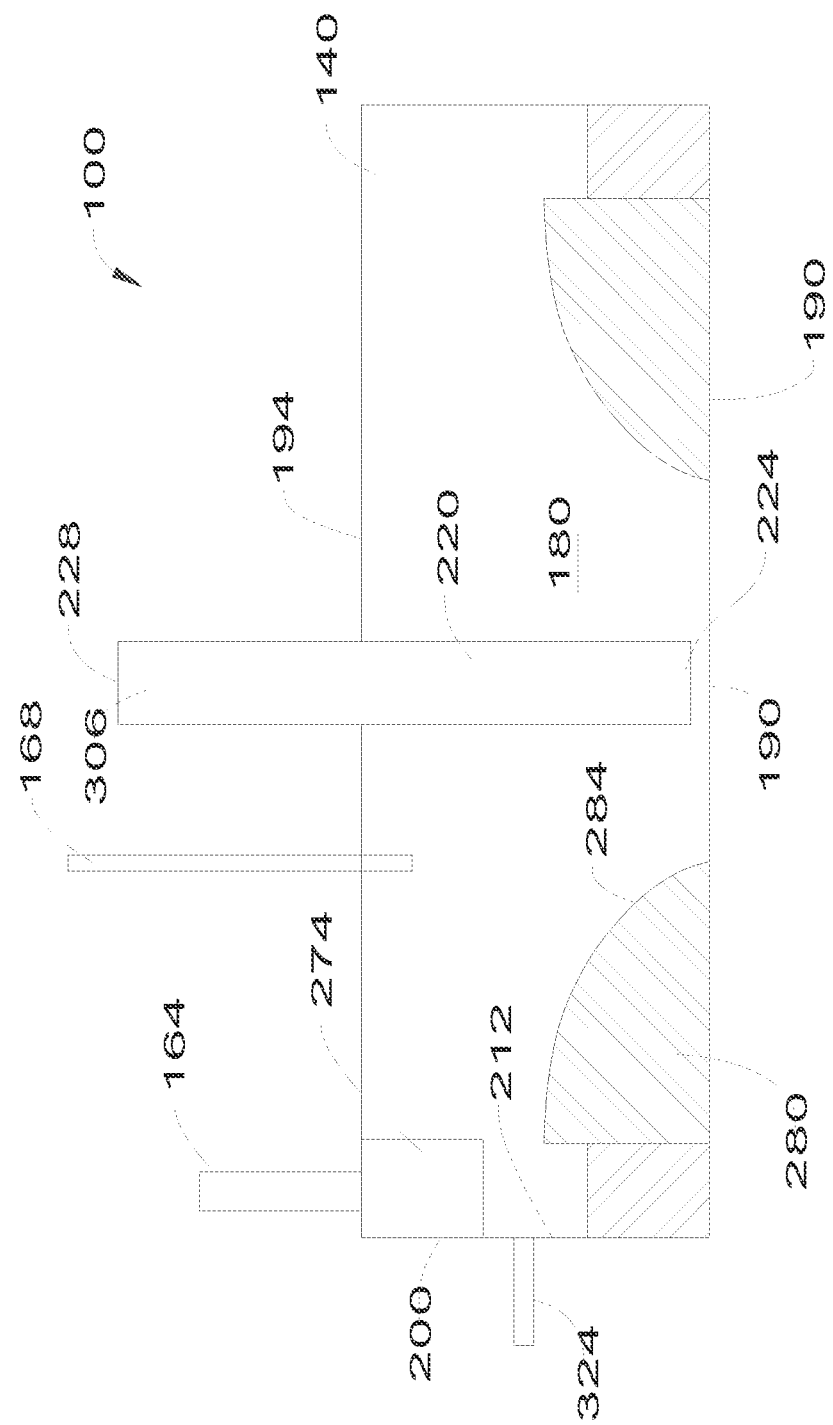

APPARATUS AND PROCESS FOR CONTACTING AND SEPARATING LIQUIDS

FIELD OF THE INVENTION

This invention generally relates to an apparatus and process for contacting and separating liquids.

DESCRIPTION OF THE RELATED ART

Generally, liquid extraction and reaction processes have been widely employed using liquid-liquid mixing in refining and chemical technologies. Such mixing technologies can be utilized for the desulfurization of liquid hydrocarbons, hydrogen fluoride alkylation for producing gasoline blends, and any other suitable process requiring the blending of liquids. Often, the mixing of two immiscible liquids may facilitate a chemical reaction, or extract a substance, such as sulfur, from one liquid phase into the other. Typically, intimate mixing and contacting between immiscible phases followed by an efficient liquid-liquid phase separation is desired for accomplishing the desired reaction and/or separation.

Usually, the liquid-liquid extractors may only perform the extraction function. As an example, static mixers may provide efficient mixing, but often a settling vessel is required downstream in the mixture to separate the two liquid phases. Mixing in a stirred tank can also be very efficient, but the impeller action may result in emulsification slowing separation of the two liquids afterwards. A further mechanism for extraction can be packed bed columns. Another alternative is a vertical tray column used for liquid-liquid extraction that can offer suitable efficiency due to minimum back mixing. However, sufficient space between each tray is typically required for immediate phase separation and to prevent bypassing of a tray by a solvent. Also, the tray column may have limited turndown capability and require some settling volume after the last trays for producing a fine phase separation. Additionally, overflow weirs and downcomers can take up additional space inside the column and reduce the effective tray area. As such, the tray column height can be quite long and diameter is larger than theoretical to accommodate the internals. The height of the column can make it unsuitable for modulation and substantial resources may be required to erect the column in the field and to make the required connections.

As described above, it is desired to find a liquid-liquid mixing and separation apparatus that can be compact and provide robust performance, and a process corresponding thereto.

SUMMARY OF THE INVENTION

One exemplary embodiment can be an apparatus for contacting a first liquid and a second liquid. The apparatus can include a vessel. The vessel can include a wall and a funnical frustum. The wall may form a perimeter about an interior space and include a first side and a second side forming a passageway communicating at least one of the first and second liquids to the interior space. The funnical frustum may be positioned proximate to the passageway and abut the wall for facilitating contacting of the first and second liquids.

Another exemplary embodiment may be an apparatus for contacting liquids. The apparatus can include the vessel having a wall forming a perimeter about an interior space therein, a top coupled to the wall, and a bottom coupled to the wall. The wall can form a first side and a second side to provide a passageway for at least one liquid. The first side may form a first vane and a second vane. Generally, the second vane tapers the passageway for forming a slot providing at least one liquid into the vessel.

A further exemplary embodiment can be a process for separating immiscible liquids. The process may include providing at least one of the liquids via a slot of a passageway formed by a first side tapering towards a second side above a funnical frustum to impart a swirling motion at an acceleration of about 1-about 60 g, alternatively about 10-about 60 g, to the at least one liquid exiting the slot.

A liquid-liquid vortex contactor can produce a highly dispersed liquid-liquid mixture in a field of centrifugal forces inside a vortex zone to provide intimate contact between two liquid phases for facilitating a liquid-liquid reaction or extraction. The turbulence in the vortex can result in a very large interfacial area for chemical reaction or mass transfer, typically an attractive characteristic for liquid-liquid extraction. In one exemplary embodiment, an almost 100% of a theoretical extraction may be achieved.

Generally, the operation of a liquid-liquid vortex contactor can be based on the rotation of two liquids. In general, the tangential motion of mode of a first liquid (continuous phase) can be used to swirl and break up a second liquid (dispersed phase). As a consequence, it is possible to approach one theoretical stage in a vortex contactor.

Desirably, the vortex contactor provides sufficient yet not excessive shear to reduce the volume required for subsequent phase separation. The proposed liquid-liquid mixer and contactor design can utilize vortex contacting technology. As such, this suitable design is typically desired to reduce the size and cost of liquid-liquid extractors and/or reactors.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more. The stream may include substances in addition to or other than one or more hydrocarbons, such as an alkaline, an acid and/or water.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of generally at least about 50%, and preferably about 70%, by mole, of a compound or class of compounds in a stream. If referring to a solute in solution, e.g., one or more thiol compounds in an alkaline solution, the term "rich" may be referenced to the equilibrium concentration of the solute. As an example, about 5%, by mole, of a solute in a solvent may be considered rich if the concentration of solute at equilibrium is 10%, by mole.

As used herein, the term "substantially" can mean an amount of generally at least about 80%, preferably about 90%, and optimally about 99%, by mole, of a compound or class of compounds in a stream. If referring to a solute in solution, e.g., one or more thiol compounds in an alkaline solution, the term "substantially" may be referenced to the equilibrium concentration of the solute. As an example, about 8%, by mole, of a solute in a solvent may be considered substantial if the concentration of solute at equilibrium is 10%, by mole.

As used herein, the term "frustum" can mean a solid figure formed when a plane, which is substantially parallel to a base or a top of a cone, a pyramid, and a funnel, sections the shape. With respect to the term "funnical frustum", the sectioning plane can pass through a conical portion of the funnel and substantially parallel to another plane perpendicular to the mouth of the funnel.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g., a screw, a nail, a staple, or a rivet; an adhesive; or a solder.

As described herein, the term "coalescer" can be a device containing at least one of a metal mesh, one or more vanes, one or more glass fibers, sand, and anthracite coal to facilitate separation of immiscible liquids of similar density. These components may be constructed of or coated with materials that exhibit hydrophobic-oleophilic characteristics.

As used herein, the term "g-force" can be abbreviated "g" and mean the angular acceleration imparted to a liquid and can be in units of meter per second squared (abbreviated m/s$^2$). One "g" can equal 9.8 m/s$^2$.

As used herein, the term "kilopascal" may be abbreviated "KPa" and all pressures disclosed herein are absolute.

As used herein, the term "cross-sectional" may refer to a view of only a slice or portion of a component or apparatus without depicting underlying elements.

As used herein, the term "immiscible" can describe substances of the same phase or state of matter that cannot be uniformly mixed or blended. As an example, such immiscible mixtures can include liquids such as oil and water, or caustic, such as a water solution of sodium or potassium hydroxide, and hydrocarbon.

BRIEF DESCRIPTION OF THE DRAWINGS

FIG. 7 is a cross-sectional, elevational view of yet another further exemplary apparatus.

DETAILED DESCRIPTION

Figure 1:
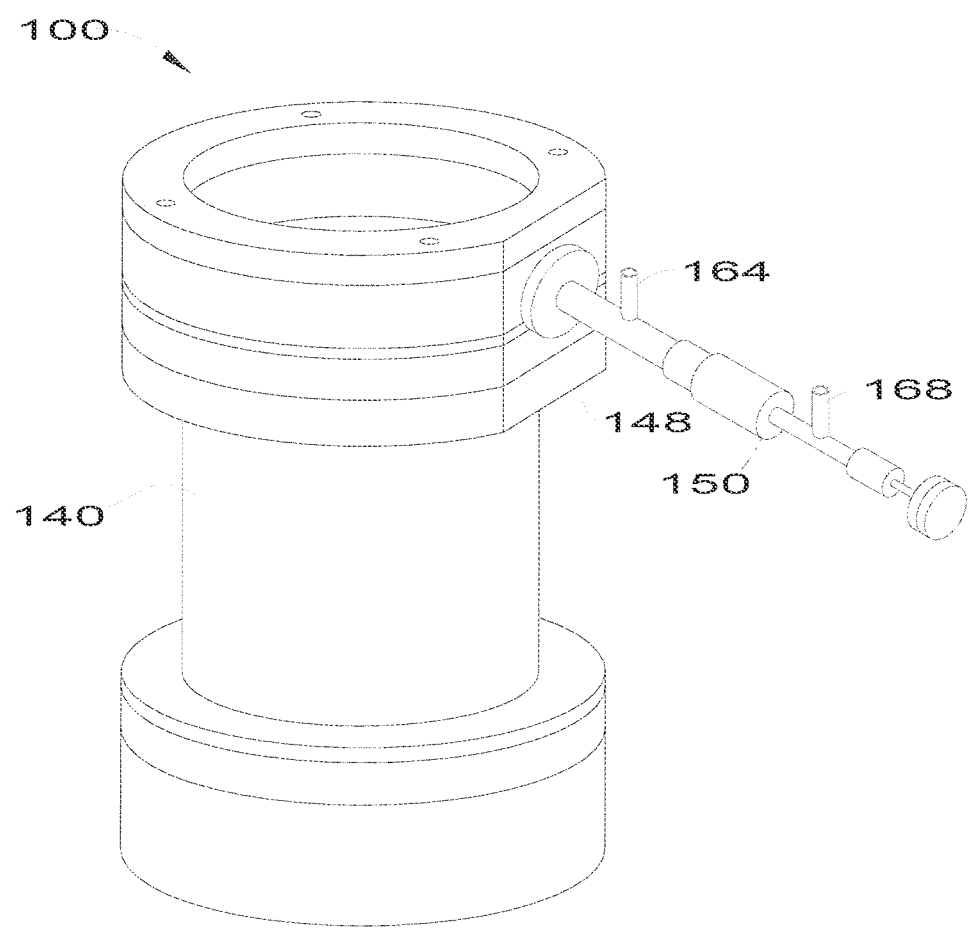
FIG. 1 is a perspective view of an exemplary apparatus for contacting liquids.

Generally, two methods can be used to introduce liquid into a liquid-liquid vortex contactor. In one exemplary case, the two liquids may be mixed upstream introduced simultaneously into the liquid-liquid vortex contactor. Then the mixture can enter the body via a swirler located at the periphery of the liquid-liquid vortex contactor. The swirler can be incorporated into a wall of the vortex contactor or a component consisting of a thin ring with multiple slots and tangential guiding sides or vanes designed to produce a smooth transition from pressure energy to rotational momentum. In the second case, the continuous phase liquid can enter the liquid-liquid vortex contactor through a swirler, as described above. The dispersed phase may be introduced separately inside the liquid-liquid vortex contactor, preferably directed towards a perimeter, such that the dispersed phase can travel by centrifugal forces through the continuous phase.

The apparatus as disclosed herein can facilitate the extraction of a component from two immiscible liquids. Although densities may be similar, one liquid is typically heavier than the other. Usually, the first liquid can be lighter and less dense and the second liquid may be heavier and denser. Often, the first liquid can be at least one hydrocarbon, such as naphtha, hexane, dodecane, and a liquefied petroleum gas; and the second liquid can be water or an acidic or an alkaline solution thereof, such as a sodium and/or potassium hydroxide solution. Generally, the first liquid contains a substance to be extracted and/or reacted, such as one or more sulfur compounds. Extracted substances can include one or more sulfur compounds. Often, the substance is extracted from the hydrocarbon liquid into an alkaline solution. Examples can include contacting a liquefied petroleum gas containing one or more sulfur compounds and a solution of sodium hydroxide, a liquefied petroleum gas containing one or more sulfur compounds and water, or hexane containing one or more sulfur compounds and water.

Also, the apparatus as disclosed herein can be utilized for contacting two immiscible liquids for facilitating reaction, such as alkylation, with an acid catalyst, such as hydrofluoric acid or sulfuric acid. Although two liquids are described as being utilized in the apparatus, it does not exclude the inclusion of a third or additional liquids for facilitating the reactions and/or extractions.

At preferred operating conditions, the mixture of the two liquids can form a highly dispersed liquid-liquid vortex layer. As a consequence, this can ensure the highest mass transfer and/or reaction rates.

The spinning vortex may be conveyed downstream by hydraulics. Although not wanting to be bound by theory, the rotational movement of the mixed fluid is accelerated by means of a frustum, preferably a curved internal structure, which may enable the heavier phase to move rapidly toward the vortex contactor walls. Moreover, the frustum can maintain the stability of the vortex and smoothing of pressure and flow. The curved internal structure may include a frustum, preferably parabolic, that may abut the internal wall and taper the inner radius of the liquid-liquid vortex contactor body.

Referring to FIG. 1, one exemplary apparatus 100 for contacting can include a vessel 140 and an optional sprayer 150. Generally, the vessel 140 can be substantially cylindrical and the sprayer 150 can be coupled to the vessel 140 and form a first inlet 164 for receiving the first liquid and a second inlet 168 for receiving the second liquid. The top of the apparatus 100 is depicted as a ring surrounding a clear material, such as plastic. However, it should be understood that in other embodiments the top can be a solid, circular plate.

Figure 2:
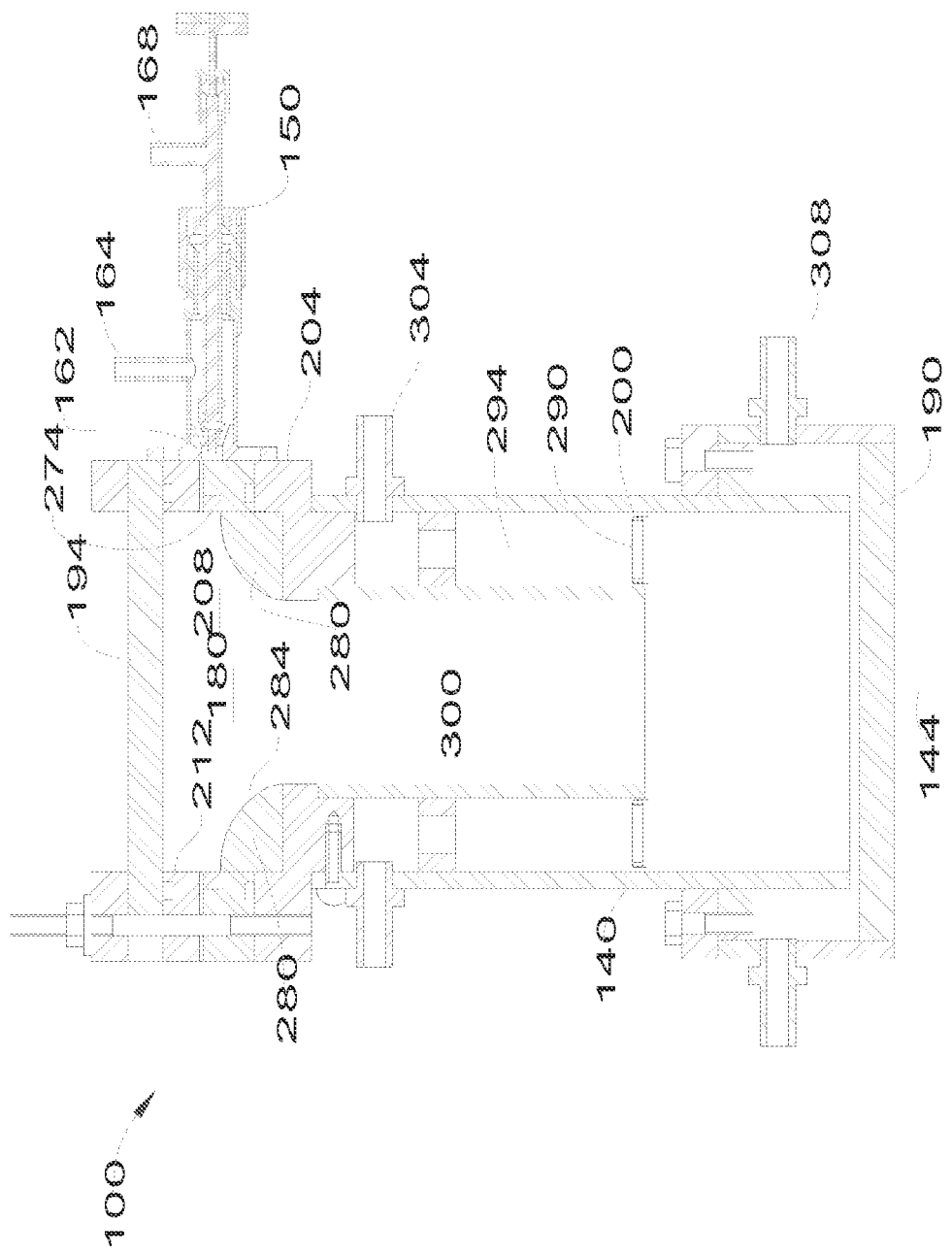
FIG. 2 is a cross-sectional, elevational view of the exemplary apparatus.
Figure 3:
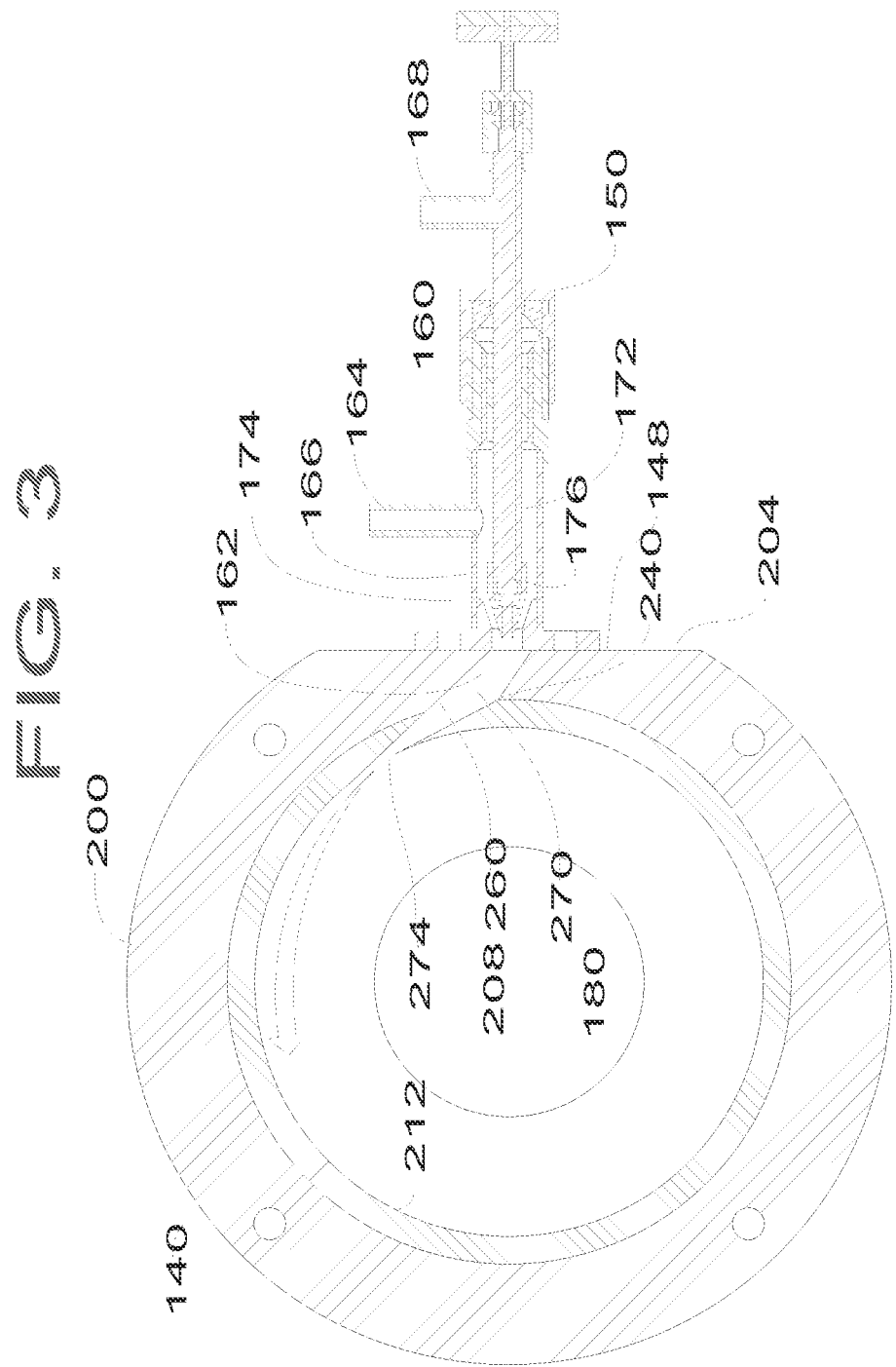
FIG. 3 is a cross-sectional, plan view of a slice of the exemplary apparatus for contacting.

Referring to FIGS. 1-3, the vessel 140 may include a vortex zone 180 and a coalescing zone 300, which can provide a volume sufficient to facilitate the separation of liquid phases. The vessel 140 may surround the zones 180 and 300 with a bottom 190, a top 194, and at least one wall 200. Usually, the at least one wall 200 forms a generally substantially cylindrical shape for surrounding the zones 180 and 300. The at least one wall 200 can form an exterior 204 to the vessel 140 and contain an interior space 208 forming a perimeter 212. The vessel 140 can be formed about a center 144. Although the vessel 140 is shown as being substantially cylindrical, it should be understood that the vessel 140 can take any suitable shape.

Additionally, the vessel 140 can also provide first outlets 304 positioned within the coalescing zone 300 and second outlets 308 positioned in the coalescing zone 300 as well as below the first outlets 304. In other embodiments, the outlets 304 and 308 can be in the vortex zone 180, or one set of outlets 304 or 308 may be in the vortex zone 180 and the other set of outlets 304 or 308 can be in the coalescing zone 300. Although two outlets are depicted for each set, it should be understood that each set, independently, may include only a single outlet 304 or 308.

Referring to the vortex zone 180, the vortex zone 180 can be contained by the at least one wall 200 forming a substantially circular cross-section, as viewed from a top, plan view as in FIG. 3. Furthermore, a frustum 280 may be positioned in the vortex zone 180. Generally, the frustum 280 is a funnical frustum, having a parabolic curvature 284 as viewed in FIG. 2. Although a parabolic profile is depicted, other suitable profiles can include a rectangular, a conical, or a concave profile. The curvature of the frustum 280 can facilitate the formation of a vortex facilitating the contacting and separation of liquids. Particularly, the second liquid can be dispersed in the first liquid. Such contacting can allow the extraction of compounds, such as one or more sulfur compounds, present in the first liquid into the second liquid. The vortex can also aid separation by thrusting the second liquid toward the perimeter 212 of the vortex zone 180 with the at least one wall 200 and swirler forming a passageway 270 from the exterior 204 to the interior space 208.

Turning to FIG. 3, typically the at least one wall 200 can form a first side 240 and a second side 260 creating a passageway 270 from the exterior 204 of the vessel 140 to the interior space 208. Although only one passageway 270 is depicted, it should be understood that several passageways may be formed by the at least one wall 200. Additionally, the passageways may be formed in the at least one wall 200, or can be formed in a separate component or components, i.e., a swirler, that can be coupled to or integrally formed with the at least one wall 200 to form the vessel 140 with the at least one wall 200 and swirler forming the passageway 270 from the exterior 204 to the interior space 208.

Turning back to FIG. 2, often the funnical frustum 280 can be positioned proximate to the passageway 270 and abutting the at least one wall 200. It should be understood, that the at least one wall 200 and the funnical frustum 280 can be formed as separate pieces and coupled together, or formed integrally together. The funnical frustum 280 can form a curvature for facilitating the formation of a vortex. At least a portion of the curvature 284 can resemble, in a cross-section, at least a portion of a mordell or parabolic curve. Generally, the cross-section of the funnical frustum 280 can resemble any suitable bell curve. Desirably, the radius of the curvature 284 substantially matches the cross-sectional radius of the vortex zone 180, as depicted in FIG. 2.

The sprayer 150 can form a first inlet 164 for receiving a first liquid and a second inlet 168 for receiving a second liquid. Both the first inlet 164 and second inlet 168 can communicate with at least one opening 162, which can be a common inlet and communicate with both inlets 164 and 168, formed in the side of the vessel 140. Generally, the sprayer 150 can form a sleeve 160 surrounding a shaft 172. Particularly, the sleeve 160 can form a void 166 in FIG. 3 communicating with the first inlet 164. Furthermore, at least a portion of the shaft 172 can be positioned within the void 166. The shaft 172 can in turn form a cavity 174 surrounding an optional solid core 176. Generally, the second inlet 168 can receive the second liquid that can at least partially fill the cavity 174 and partially surround the core 176. Similarly, the first inlet 164 can receive the first liquid that can at least partially fill the void 166 surrounding the shaft 172.

Figure 4:
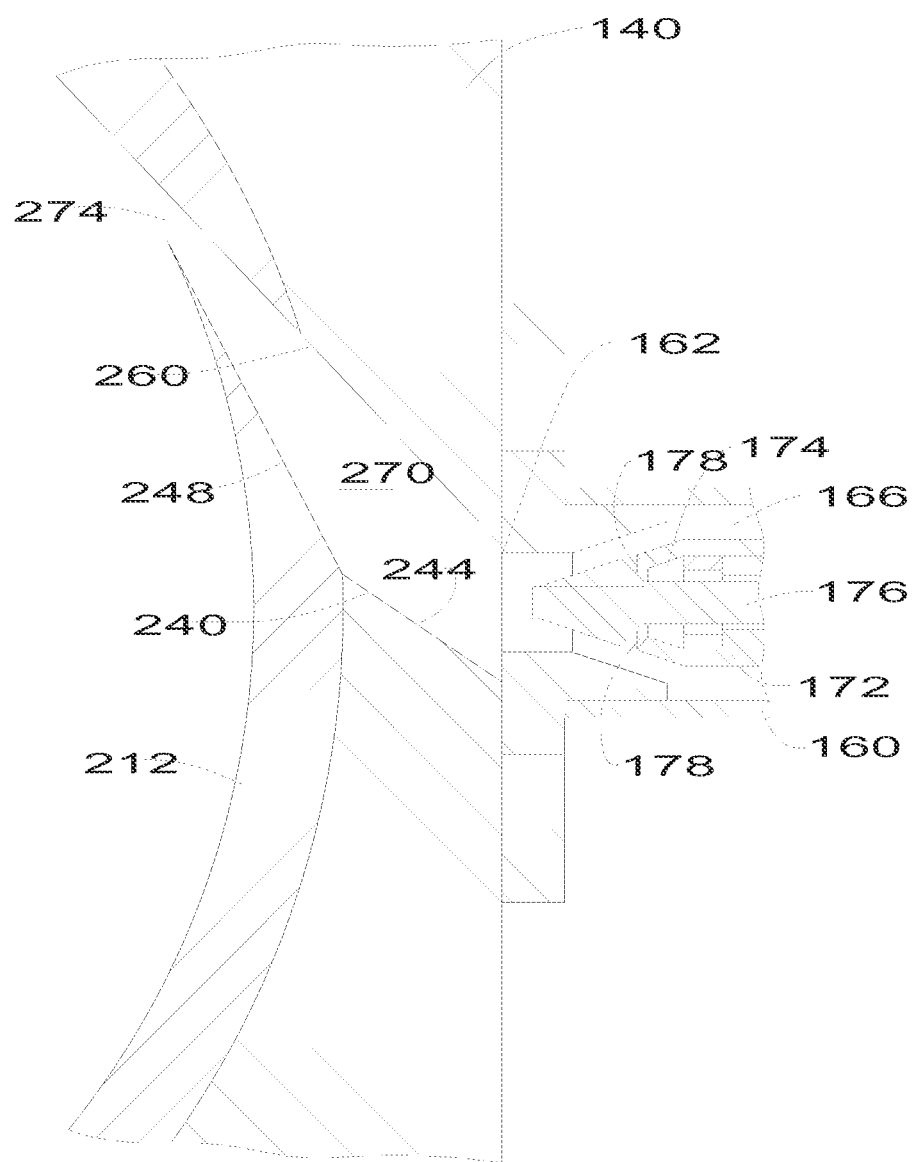
FIG. 4 is an enlarged, cross-sectional view of a slice of the exemplary apparatus.

Referring to FIG. 4, typically the second liquid can travel through the cavity 174 and exit shaft outlet 178, that can form a substantially circular passageway or multiple orifices, and communicate the first liquid to the void 166. Afterwards, the second liquid can be dispersed in the first liquid, and may enter the at least one opening 162 in the vessel 140.

Generally, the at least one opening 162 communicates with the passageway 270 defined by the first side 240 spaced apart from the second side 260. The first side 240 can form vanes, namely a first vane 244 and a second vane 248. The second vane 248 may be at an angle of about 90-about 180° with respect to the first vane 244 and taper the passageway 270 for forming a slot 274 for the exiting liquids. So, the first side 240 can taper the passageway 270 by being angled away from the second side 260 while moving inwardly in the passageway 270. As an aside, each side 240 and 260 can, independently, be considered a vane, as well as the vanes 244 and 248 being components, parts, or sub-vanes of the vane 240. Additionally, the second vane 248 can form another angle of about 10-about 20° with the second side 260. Alternatively, the another angle or slot can be less than about 7° as the diameter of the vessel 140 increases. The tapering of the passageway 270 can facilitate acceleration and impart a circular motion to the first and second liquids. Although the vanes 244 and 248 are depicted as being integrally formed with the at least one wall 200, it should be understood that the vanes 244 and 248 can be separate components coupled or integrally formed together. What is more, the vanes 244 and 248 and the sides 240 and 260 may be a part of the at least one wall 200 or formed into a separate component, such as a swirler as discussed above.

The vanes 244 and 248 may define an obtuse angle with each other. In an aspect, the first vane 244 may diverge away from the second side 260 while moving inwardly in the passageway 270. The second vane 248 may converge toward the second side 260 while moving inwardly in the passageway 270.

In operation and referring to FIGS. 1-4, a first liquid can be provided to the first inlet 164. A second liquid can be provided to the second inlet 168. The second liquid may be dispersed into the first liquid before entering the passageway 270. Often, as the liquids exit the sprayer 150 and enter the passageway 270, some contacting has already occurred.

Afterwards, the liquids may travel through the passageway 270 and exit the slot 274 with an imparted swirling motion. The sides 240 and 260 can provide a smooth transition from pressure to rotational energy and form a vortex layer above the funnical frustum 280 contacting the liquids. The second liquid forming a disperse phase can migrate to the perimeter 212 through the continuous phase of the first liquid. At the perimeter 212, the droplets of the second phase can coalesce creating stratification between the phases. Hence, the bulk of the separation may occur within the vortex zone 180.

Subsequently, the liquids can fall into the coalescing zone 300 where the second liquid can further separate from the first liquid. Coalesced droplets can settle via gravity. The first liquid may rise passing through a coalescer 290, typically a stainless steel mesh, optionally coated, to permit the first liquid to rise into an annulus-shaped chamber 294 within the coalescing zone 300 and exit through the first outlet 304 perhaps after passing though apertures. Alternatively, the annulus-shaped chamber 294 may form multiple orifices. The second liquid can progress to the bottom 190 of the vessel 140 and exit the second outlet 308 perhaps after passing under a suspended edge of an internal wall. The second liquid can be drained via the second outlet 308 to maintain the second liquid at a predetermined level. As an example, a sensor can measure the position of an interface between the first and second liquids, which may send signals to a valve regulating the flow of the second liquid from the second outlet 308. The phase separation in the vortex zone 180 can be controlled by the level of liquid, the pressure drop of the liquids injected, and the pressure at the outlets 304 and 308 to control the amount of phase separation in the vortex zone 180.

Generally, any suitable pressure can be utilized with the swirler formed by the at least one wall 200 to impart a g-force. Such a g-force can be about 1-about 60 g, or greater than about 10 g in the vortex zone 180. Typically, the g-force can vary depending on the location, and may exceed 60 g at other locations, such as the passageway 270. A pressure drop the opening 162 to the slot 274 can be about 5-about 350 KPa, preferably about 5-about 170 KPa. In other suitable embodiments, the g-force can be less than about 1 g.

Figure 5:
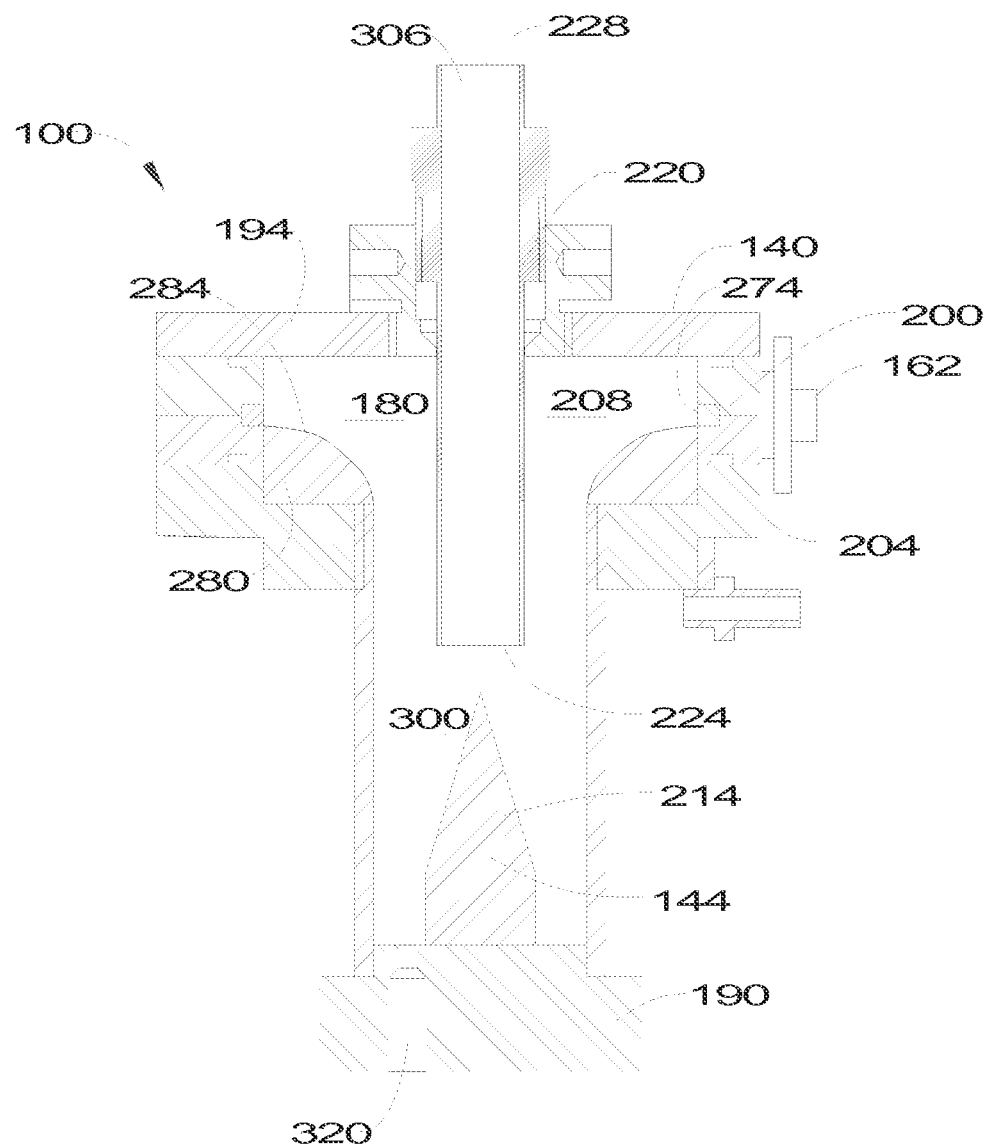
FIG. 5 is a cross-sectional, elevational view of another exemplary apparatus.
Figure 6:
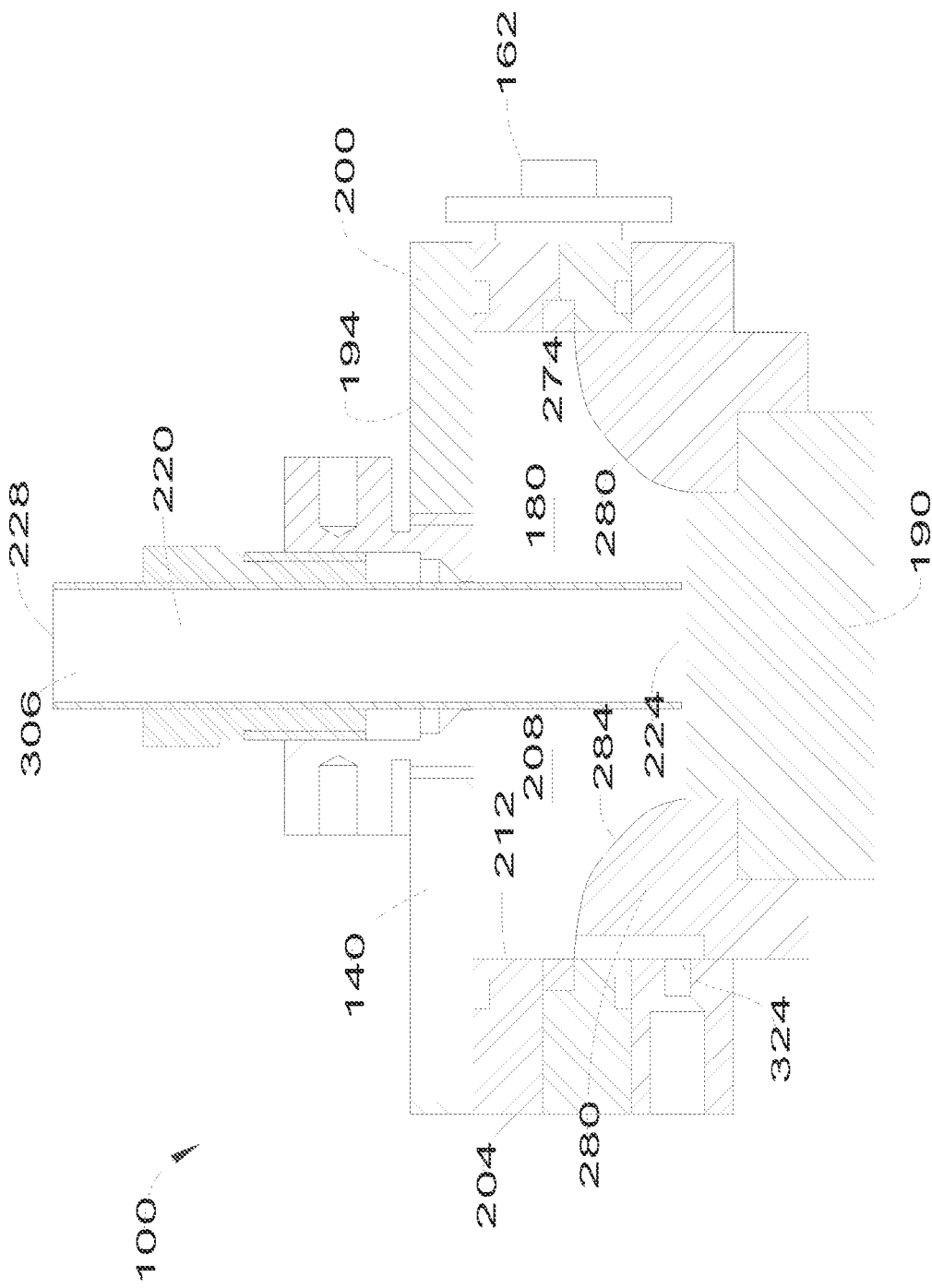
FIG. 6 is a cross-sectional, elevational view of a further exemplary apparatus.

FIGS. 5-7 illustrate further embodiments of the apparatus of FIGS. 1-4 absent a sprayer 150 with different configurations for the vessel 140. Elements of the vessels in FIGS. 5-7 with the same elements as in FIGS. 1-4 may have the same respective reference numerals as in FIGS. 1-4, even if the elements are depicted with different shapes. Moreover, a sprayer 150 may be used, although not required. These versions may operate similarly to the vessel described above in FIGS. 1-4, unless otherwise indicated.

Referring to FIG. 5, another version of the apparatus 100 for contacting is depicted. The apparatus 100 can include the substantially cylindrical vessel 140, containing the vortex zone 180 and the coalescing zone 300. In this exemplary embodiment, at least one opening 162 may receive the liquids, such as the first liquid and the second liquid, which can be provided into the vortex zone 180 via a passageway and the slot 274. The passageway can be formed by the at least one wall 200, as described above. In addition, the coalescing zone 300 can contain a cone 214 coupled to the bottom 190 positioned proximate to the center 144 for promoting rotational velocity while keeping the centrifugal force from degrading and a tube 220. Often, a first end 224 and a second end 228 of the tube 220 provides the first outlet 306 from the vessel 140 and be positioned proximate to the center 144 of the vessel 140. Moreover, the tube 220 can permit the apparatus 100 to have a larger capacity. As such, the first liquid typically may enter the first end 224 and exit through the top 194 of the vessel 140 through the second end 228, optionally having a small amount of the second liquid. What is more, the second liquid may pass to the bottom 190 of the coalescing zone 300 and exit via a second outlet 320 positioned or formed within the floor or bottom 190. Generally, the apparatus 100 operates at any suitable pressures and g-forces as described above.

Referring to FIG. 6, a further exemplary apparatus 100 is depicted. In this exemplary apparatus 100, the vessel 140 can only contain a single zone, namely the vortex zone 180. The first and second liquids may again be provided through the at least one opening 162 with or without the sprayer and enter the passageway 270 formed by the at least one wall 200. In this exemplary embodiment, the liquids may be pressurized to exit the slot 274 and swirl at about 1-about 60 g within the vortex zone 180. Usually, this higher acceleration of the liquids enhances separation so that the first liquid can enter the tube 220 via the first end 224 and exit via the second end 228 through the first outlet 306. Often, the second liquid is thrust against the perimeter 212, form larger droplets, and can exit the second outlet 324 formed in the at least one wall 200 in a position substantially perpendicular to the tube 220. Generally, the relatively high g-force eliminates the coalescing zone and thus can provide a compact device requiring less capital costs.

Referring to FIG. 7, yet another version of the apparatus 100 is depicted. In this particular embodiment, the apparatus 100 can also include a single zone, namely a vortex zone 180. The first liquid may be communicated by a first inlet 164 formed within the top 194 of the vessel 140 that can extend downward and an adjacent to a passageway formed in at least one wall 200 terminating in a slot 274. Generally, the passageway and the slot 274 is dimensioned as described above to impart a swirl to the first liquid at an angular acceleration of about 1-about 60 g at a high pressure, and can vary depending on the location, as described above. The second liquid can be provided via a tube serving as the second inlet 168 into the vortex zone 180. The second liquid may be introduced substantially perpendicular to the direction of the first liquid to contact and disperse in the first liquid. Initially, the first liquid can be biased toward the perimeter 212. The droplets of the second liquid may be thrust to the perimeter passing through the first liquid. Hence, two phases can be formed into a vortex layer with the first liquid being the continuous phase and the second liquid being the disperse phase. The rotational motion of the combined phases can be accelerated by the frustum 280. At the perimeter 212, the droplets of the second liquid can coalesce at least partially stratifying the second liquid from the first liquid to begin separation. Thus, the bulk of the separation may take place inside the apparatus 100.

The first liquid can fall towards the bottom 190 and exit the tube 220 via the first outlet 306. The second liquid may form larger droplets at the perimeter 212 and exit the second outlet 324 formed in the at least one wall 200.

The first liquid can exit as a hydrocarbon product that generally includes about 1-about 10 ppm, preferably no more than about 1 ppm, by weight, of, independently, a cation such as sodium associated with, e.g., an alkaline liquid, and one or more sulfur compounds. However, it should be understood that several vessels can be used in series so the hydrocarbon effluent exiting the last vessel can ensure that no more than about 1 ppm, by weight, of, independently, the cation and one or more sulfur compounds can be present in the hydrocarbon product.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An apparatus for contacting a first liquid and a second liquid, comprising:
   a vessel, comprising:
   A) a wall forming a perimeter about an interior space and comprising a first side and a second side forming a passageway communicating at least one of the first and second liquids to the interior space; and
   B) a funnical frustum forming a parabolic curvature positioned proximate to the passageway and abutting the wall for facilitating contacting of the first and second liquids.

2. The apparatus according to claim 1, wherein the first side tapers towards the second side.

3. The apparatus according to claim 1, wherein the vessel contains a vortex zone and a coalescing zone.

4. The apparatus according to claim 3, further comprising a tube positioned proximate to a center of the vessel and having a first end in the vortex zone and a second end outside the vessel.

5. The apparatus according to claim 4, further comprising a bottom coupled to the wall and a cone coupled to the bottom proximate to a center of the vessel and opposite of the tube positioned proximate to a top of the vessel.

6. The apparatus according to claim 5, wherein the tube provides a first outlet and a second outlet is formed within the bottom.

7. The apparatus according to claim 4, wherein the tube provides a first outlet and a second outlet formed in the wall and positioned substantially perpendicular to the tube.

8. The apparatus according to claim 3, further comprising a first outlet located within the coalescing zone and a second outlet located therebelow.

9. The apparatus according to claim 1, wherein the vessel contains only a vortex zone.

10. The apparatus according to claim 1, wherein the passageway provides at least one liquid about the perimeter of the interior space.

11. The apparatus according to claim 1, wherein the first side is spaced apart from the second side, and the first side comprises a first vane and a second vane with the second vane at an angle of about 90-about 180° with respect to the first vane, and
   the second vane tapers the passageway with respect to the second side to form a slot for at least one liquid exiting the passageway.

12. The apparatus according to claim 1, further comprising a sprayer communicating with the passageway, wherein the sprayer comprises:
   a sleeve forming a void communicating with a first inlet for receiving the first liquid; and
   a shaft positioned within the void and forming a cavity communicating with a second inlet for receiving the second liquid;
   wherein the sleeve and the shaft terminate communicating the void and the cavity for contacting and providing the first and second liquids to the passageway.

13. The apparatus according to claim 1, wherein the passageway communicates with a first inlet for a first liquid and a second inlet positioned substantially perpendicular at a top of the vessel for providing a second liquid.

14. An apparatus for contacting liquids, comprising:
   A) a vessel comprising a wall forming a perimeter about an interior space therein, a top coupled to the wall, and a bottom coupled to the wall;
   B) the wall forming a first side and a second side to provide a passageway for at least one liquid;
   C) the first side forming a first vane and a second vane wherein the second vane tapers the passageway for forming a slot providing at least one liquid into the vessel; and
   D) a funnical frustum positioned below the passageway and forming a parabolic curvature for facilitating the formation of a vortex.

15. The apparatus according to claim 14, wherein the second vane forms an angle of about 90-about 180° with respect to the first vane.

16. The apparatus according to claim 15, further comprising a tube positioned approximate to a center of the vessel for providing an outlet.

17. The apparatus according to claim 16, further comprising a second outlet formed within the wall and positioned approximately perpendicular to the tube.

18. The apparatus according to claim 14, wherein the vessel contains a vortex zone and a coalescing zone.

* * * * *